United States Patent [19]
Seizert et al.

[11] Patent Number: 5,207,463
[45] Date of Patent: May 4, 1993

[54] FUEL SENDER LOCKING RING

[75] Inventors: Robert D. Seizert, Brooklyn; James R. Osborne, Pontiac, both of Mich.

[73] Assignee: Solvay Automotive, Inc., Houston, Tex.

[21] Appl. No.: 803,973

[22] Filed: Dec. 9, 1991

Related U.S. Application Data

[63] Continuation-in-part of Ser. No. 668,144, Mar. 11, 1991, Pat. No. 5,102,172, which is a continuation of Ser. No. 419,486, Oct. 10, 1989, Pat. No. 4,998,639.

[51] Int. Cl.$^5$ .............................................. B65D 41/06
[52] U.S. Cl. .................................. 292/256.6; 220/298
[58] Field of Search ................... 292/256.6; 220/298, 220/85 F, 203, 297, 298; 215/332

[56] References Cited

U.S. PATENT DOCUMENTS

| | | | |
|---|---|---|---|
| 1,833,694 | 11/1931 | Stant | 220/295 |
| 1,846,677 | 2/1932 | Edwards | 137/152 |
| 1,866,126 | 7/1932 | Payson et al. | 312/116 |
| 1,882,097 | 10/1932 | Stant | 220/302 |
| 1,989,297 | 1/1935 | Stant | 220/24 |
| 2,680,477 | 6/1954 | Schira, Jr. | 137/565 |
| 3,076,577 | 2/1963 | Craig | 220/297 |
| 4,081,102 | 3/1978 | Sakai | 220/203 |
| 4,333,580 | 6/1982 | Sweigart, Jr. | 220/4.13 |
| 4,482,075 | 11/1984 | Stotz et al. | 220/862 |
| 4,497,419 | 2/1985 | Reitzel | 220/302 |
| 4,501,376 | 2/1985 | Bushby | 220/298 |
| 4,762,244 | 8/1988 | Ziegler | 220/203 |
| 4,998,639 | 3/1991 | Seizert et al. | 220/85 F |
| 5,102,172 | 4/1992 | Seizert et al. | 292/256.6 |

FOREIGN PATENT DOCUMENTS

| | | |
|---|---|---|
| 2734217 | 8/1979 | Fed. Rep. of Germany . |
| 135108 | 11/1979 | German Democratic Rep. . |
| 135109 | 11/1979 | German Democratic Rep. . |
| WO91/05713 | 5/1991 | World Int. Prop. O. . |

Primary Examiner—Richard E. Moore
Attorney, Agent, or Firm—Willian Brinks Olds Hofer Gilson & Lione

[57] ABSTRACT

A locking member for use in a fuel tank assembly of the type having a pressurizable tank with an aperture and having a plurality of retaining lugs transversely extending along the periphery of the tank aperture. A fuel sender assembly has a first portion disposed within the aperture and a second portion having a plate-like shoulder in a mating contact with an external tank surface. A seal element is disposed between the tank and the fuel sender assembly in an annular groove or other seal arrangement provided in the external tank surface intermediate the aperture and the retaining lugs. The locking member comprises a locking ring having an aperture through which a portion of the fuel sender assembly extends, the locking ring having a generally planar lower surface in a mating contact with an upper surface of the plate-like shoulder of the fuel sender assembly and having a plurality of tabs corresponding to the plurality of retaining lugs. The locking ring preferably has at least one upwardly projecting protrusion placed around the circumference of the locking ring. The protrusions enhance structural integrity of the locking ring. The tabs have a locking surface, for lockingly engaging the retaining lugs, and a flange section surrounding the retaining lugs for inhibiting permanent deformation thereof due to increased fluid pressure within the tank.

48 Claims, 10 Drawing Sheets

FUEL SENDER LOCKING RING

CROSS-REFERENCE TO RELATED APPLICATIONS

This is a continuation-in-part of our co-pending U.S. patent application Ser. No. 07/668,144, filed on Mar. 11, 1991, now U.S. Pat. No. 5,102,172, issued Apr. 7, 1992 which is a continuation of U.S. patent application Ser. No. 07/419,486, filed on Oct. 10, 1989, now U.S. Pat. No. 4,998,639. The entire contents of both aforementioned prior applications are incorporated herein by reference.

BACKGROUND AND SUMMARY OF THE INVENTION

The present invention relates to automotive fuel delivery systems and, in particular, to an improved locking ring for locking a fuel sender assembly to a fuel tank.

Conventional automotive fuel sending systems typically include a locking ring for securely mounting and sealing a fuel sender assembly to a fuel tank. Commonly, the locking ring is provided with lug supports along its outer peripheral edge which lockingly engage retaining lugs extending from the fuel tank for sealing the fuel sender assembly therebetween. Such systems are designed to permit a predetermined amount of fuel leakage and venting of fumes immediately upon impact to relieve any excessive pressure build-up within the fuel tank. However, it is critical that the fluid-tight seal between the fuel sender assembly and the fuel tank be maintained following venting of a pressure build-up to prevent excessive fuel and vapor leakage. In particular, a primary reason for premature release of fuel and fumes upon vehicular impact is the failure of the locking ring to withstand the increased tank pressure. The increased tank pressure acting on the fuel sender assembly and locking ring can cause permanent deformation of the retaining lugs. Structural deformation of the retaining lugs results in degradation of the seal between the fuel sender assembly and the fuel tank. Furthermore, with the advent of stricter vehicle safety standards, conventional fuel delivery systems are inadequate to meet minimum crashworthiness requirements.

It is therefore an object of the present invention to provide a relatively simple and inexpensive design for an improved locking ring for use in automotive fuel delivery systems. The improved locking ring of our invention can withstand substantially greater fuel tank pressures following vehicular impact than heretofore known rings. It is, therefore, very effective in inhibiting premature leakage of fuel and vapors from the fuel tank. The improved locking ring inhibits permanent deformation of the fuel tank retaining lugs to maintain the fuel sender assembly in a sealed relationship with the fuel tank.

One embodiment of the invention is directed to a fuel tank assembly comprising a hollow, pressurable tank for storing liquid fuel and having an aperture extending through a generally planar, external surface of the tank. The assembly also comprises a fuel sender unit, at least partially disposed within the aperture and having a radially-extending shoulder having generally parallel planar first and second surfaces. The second surface is adopted to be in a mating contact with the planar external surface of the tank, so as to enclose the aperture. A sealing means is placed between the second surface of the fuel sender unit and the planar, external surface of the tank for producing a fluid-tight seal therebetween. A plurality of retaining lugs extend from the planar, external surface of the tank. The retaining lugs comprise a first leg member extending substantially perpendicularly from the planar, external surface of the tank, and a second leg member, which is continuous with and extends generally orthogonally from one end of the first leg. The retaining lugs are located around the periphery of the aperture and radially outward of the shoulder of the fuel sender unit.

The assembly additionally comprises a locking ring, which comprises an engaging means for lockingly engaging the second leg member. The engaging means is adapted to coact with the second leg member to bias the shoulder of the fuel sender unit against the external tank surface. The engaging means is also adapted to bias the sealing means at a position radially inward of the first surface of the first leg, so as to lock the fuel sender unit to the tank. The locking ring further comprises one or more tabs for surrounding the second surface of the first leg. The tabs inhibit permanent radially outward deformation of the retaining lugs if pressure within the fuel tank is increased, for example, in a car accident. At least one upwardly projecting protrusion is placed in a surface of the locking ring. The protrusions, which extend in a radial direction of said locking ring, enhance the structural integrity of the locking ring, and therefore enable the fuel assembly to withstand higher pressures within the fuel tank than otherwise possible.

In one embodiment, the tabs comprise an inner flange and an outer flange. The inner flange comprises an upstanding projection which is capable of being lockingly engaged by the second leg member to lock the locking ring to the fuel tank.

Other advantages and features of the invention will become apparent from the following specification taken in connection with the accompanying drawings.

DETAILED DESCRIPTION OF THE PREFERRED EMBODIMENTS

Figure 1:
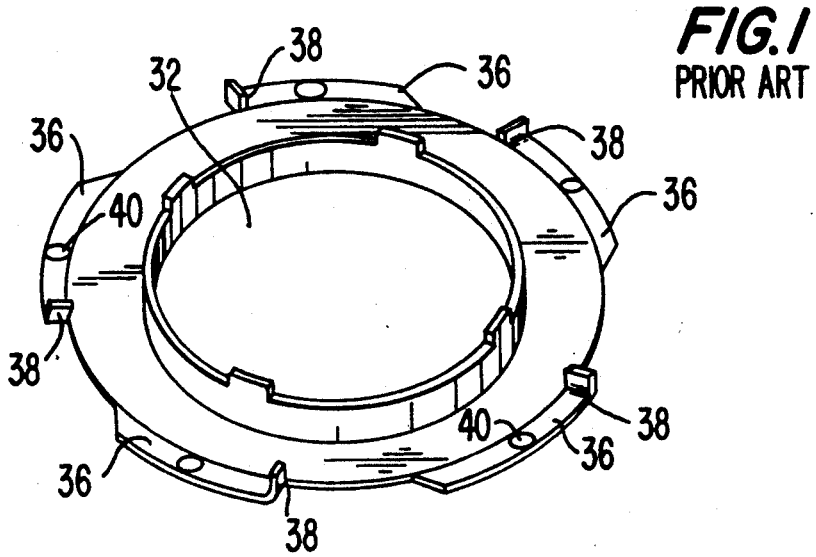
FIG. 1 is a perspective view of a conventional fuel sender locking ring.
Figure 2:
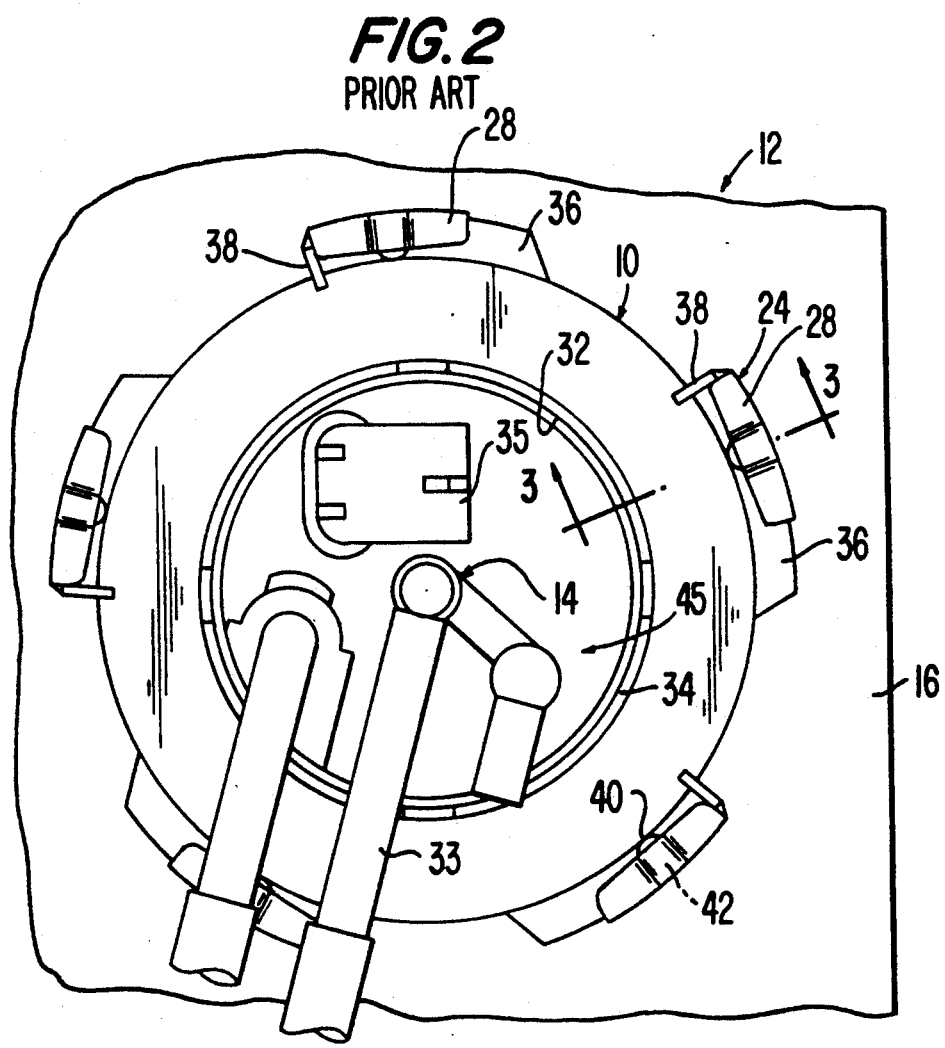
FIG. 2 is a partial top view of a conventional fuel tank assembly illustrating the operational relationship of the several components.
Figure 3:
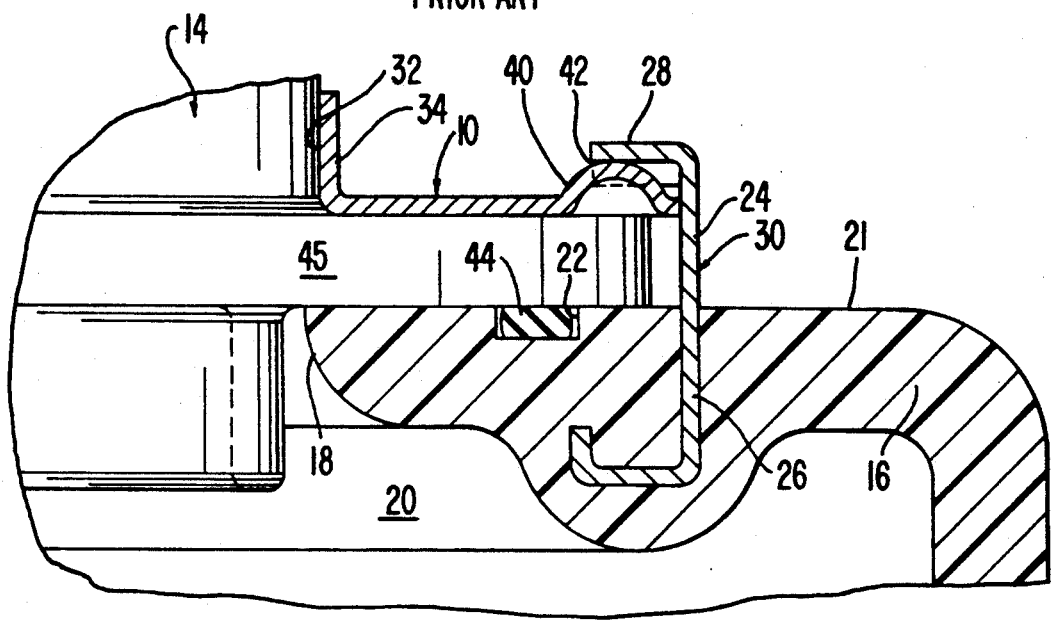
FIG. 3 is a cross-sectional view taken along line 3—3 of FIG. 2.

Referring now to the drawings, FIGS. 1 through 3 illustrate a conventional fuel sender locking ring 10 for use with a fuel tank assembly 12. The locking ring 10 is employed to secure a fuel sender assembly 14 to the fuel tank assembly 12. More particularly, the fuel tank assembly 12 comprises a fuel tank 16 having a generally circular opening or aperture 18 through which a lower portion of the fuel sender assembly 14 extends. In this manner, various components (not shown) of the fuel sender assembly 14 are oriented to partially extend into an internal pressurized chamber 20 of the fuel tank 16. The fuel tank 16 has a substantially planar external surface 21 which is generally perpendicular to the axis of the aperture 18. An annular groove 22 is provided in the external surface 21. The annular groove 22 is concentric with the central axis of aperture 18 and is located radially outward thereof.

The fuel tank assembly 12 further includes means for semipermanently securing the locking ring 10 to the fuel tank 16. This includes a plurality of evenly spaced retaining lugs 24, located radially outward of, and concentric with the groove 22. The arcuate-shaped retaining lugs 24 are disposed around the circumference of the groove 22 and have a first leg 26 extending transversely to the planar external surface 21 of the fuel tank 16. A second leg 28 is provided which extends radially inwardly from the first leg 26 and is generally parallel to the planar external surface 21, so as to generally define an inverted "L-shaped" configuration for the retaining lugs 24. Retaining lugs 24 are integral extensions of a ring 30 permanently encapsulated into the fuel tank 16. Further, it is preferable that the fuel tank 16 be fabricated from a thermoplastic material into which the encapsulated ring 30 is permanently secured during the molding process. Such processing could include blow-molding or rotational molding for the tank fabrication. Again, however it is within the scope of this invention that the tank 16 be fabricated from any suitable material applicable for pressurized vessels. Likewise, it is contemplated that the ring 30 can be secured directly to the planar surface 21 via conventional bonding or welding methods.

The locking ring 10 is provided with a central aperture 32 through which an upper portion of the fuel sender assembly 14 passes. This allows the connection of external fuel delivery and exhaust lines 33 and electrical connectors 35. It is within the scope of the invention that the internal diameter of the locking ring 10 may be slotted or relieved in any manner necessary to provide for irregularities in the fuel sender assembly 14, without affecting said locking ring's specified function. An axially extending rim 34, provided on the locking ring 10, surrounds the upper portion of the fuel sender assembly 14. At its outermost peripheral edge surface, the locking ring 10 is provided with a plurality of radially outwardly extending tabs 36. The number and angular spacing of the tabs 36 preferably corresponds directly to the number and angular spacing of the retaining lugs 24. As illustrated in FIGS. 2 and 3, each tab 36 is configured to be received into an "L-shaped" retaining lug 24 upon rotation of locking ring 10 into a locked position. The tabs 36 have an upstanding tab stop 38 at one end. The tab stops 38 have a greater height than the second leg 28 of the retaining lug 24, so as to positively locate each tab 36 relative to each retaining lug 24 during rotation, clockwise or counter-clockwise, depending on the design, of the locking ring 10 into a locked position. Further, the tabs 36 are provided with a centralized upwardly extending locking nub 40 configured to be lockingly received in a similarly shaped cavity 42 provided in the second leg 28 of the retaining lugs 24.

In practice, the engagement of the locking nubs 40 in the cavities 42, combined with the abutting contact of tab stops 38 with a circumferential edge of the second leg 28, act to sealingly lock the fuel sender assembly 14 to the fuel tank 16. Further, a seal member 44 placed in groove 22 is compressed by the locking relationship of the above described components to generate a fluid-tight seal therebetween, so as to prevent unintended leakage of fuel liquids and fumes.

However, during vehicular accidents in which the fuel tank is dented or otherwise deformed, or in roll-over situations, excessive pressure within the fuel tank 16 is generated which urges sender plate 45 of the fuel sender assembly 14 and the locking ring 10 to deform in a concave fashion. Such deformation plastically deforms the retaining lugs 24 in a radially outward direction such that the seal member 44 becomes improperly seated within the groove 22. As such, premature and excessive leakage of fuel from the tank occurs. As is well recognized, leakage of fuel is extremely dangerous since it creates a significant fire and explosive hazard.

Figure 4:
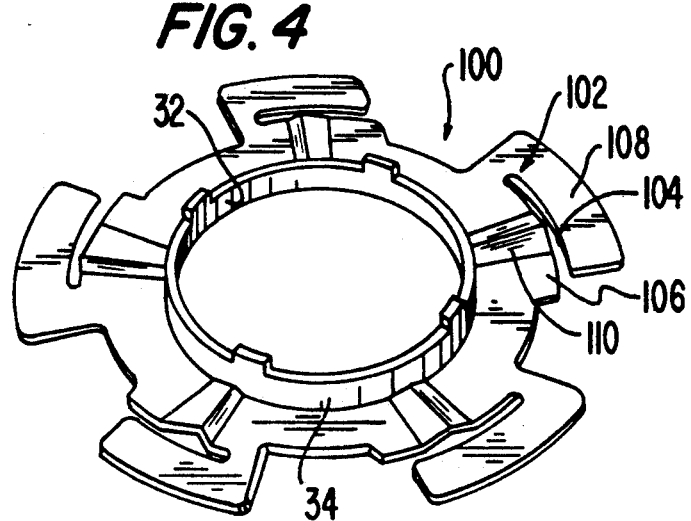
FIG. 4 is a perspective view of an improved fuel sender locking ring according to a first preferred embodiment of the present invention.
Figure 5:
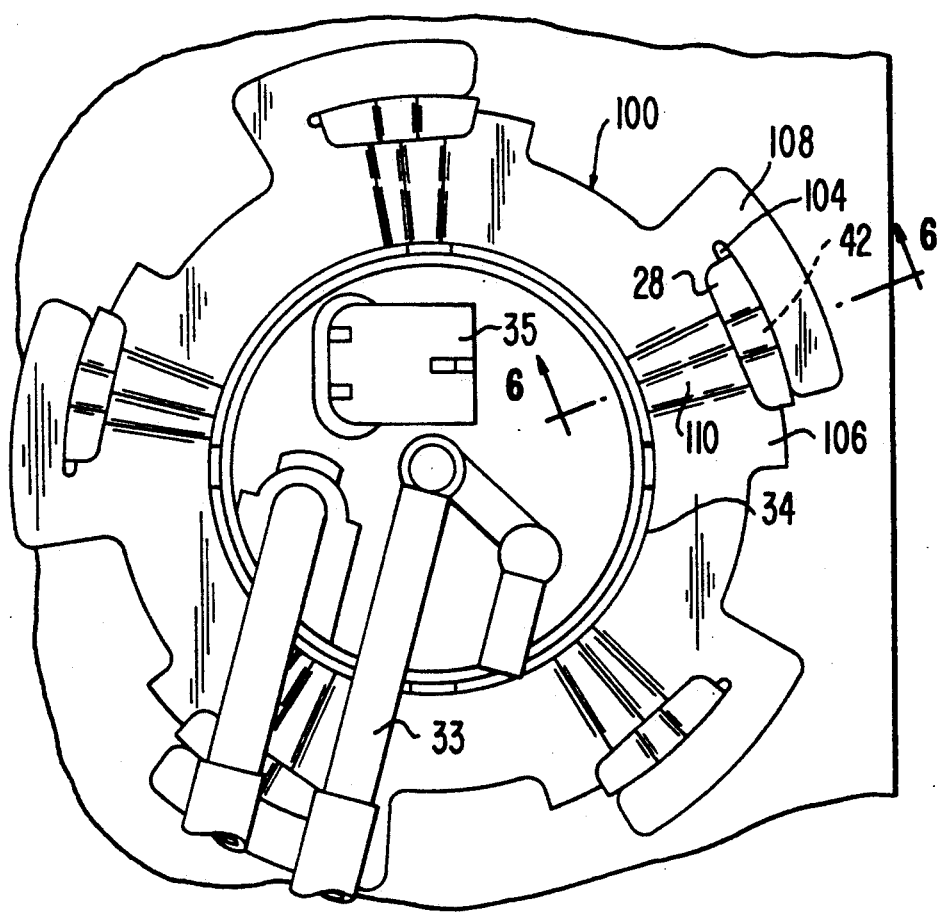
FIG. 5 is a partial top view of a fuel tank assembly incorporating the fuel sender locking ring of FIG. 4 and illustrating the operational association of the components.
Figure 6:
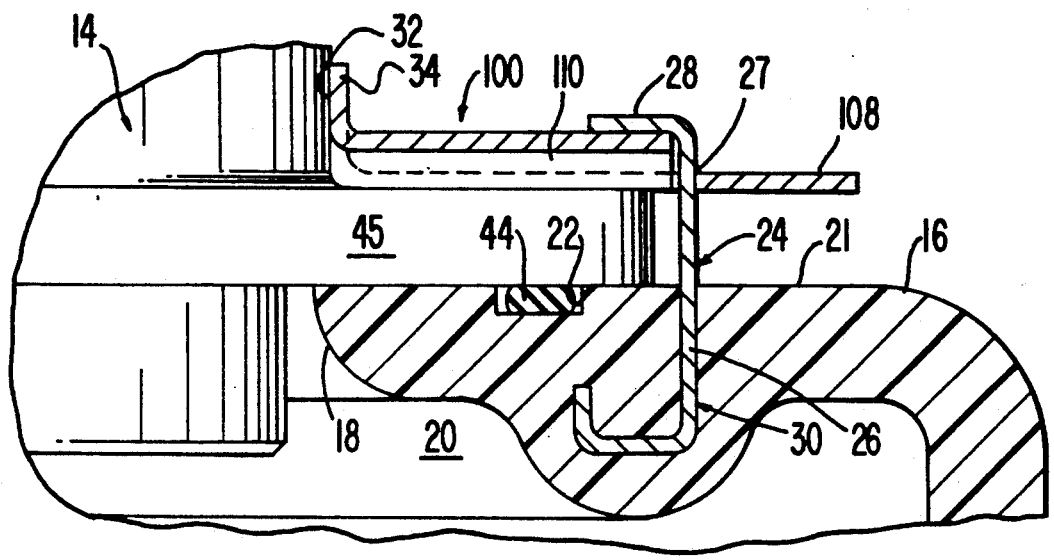
FIG. 6 is a cross-sectional view taken along line 6—6 of FIG. 5.

Referring now to FIGS. 4 through 6, a first preferred embodiment of the present invention is disclosed. For the sake of uniformity, like numbers are used for common components previously described. FIG. 4 illustrates a fuel sender locking ring 100 having a central aperture 32 and a rim 34. Preferably, the locking ring 100 is fabricated as a relatively thin gauge sheet metal stamping. At its outermost peripheral edge, the locking ring 100 is provided with a plurality of radially outwardly extending tabs 102. The tabs 102 include a slot-like arcuate opening 104 extending from one end thereof. The opening 104 defines an inner flange section 106 and an outer flange section 108. The inner flange section 106 includes a centralized portion upon which an upwardly cold-deformed protrusion is provided to define an integral locking surface or engaging means 110. The locking surface or engaging means 110 is configured to be lockingly captured in a cavity 42 of a second leg 28 provided on an "L-shaped" retaining lug 24. An outer flange section 108 of tabs 102 surrounds an outer or second surface 27 of a first leg 26 of the retaining lug 24. Preferably, the width of a slot-like opening 104 is dimensioned such that the outer or second surface 27 of the first leg 26 and the outer flange section 108 of tabs 102 are in abutting line contact along generally the entire length of slot-like opening 104. In this manner the outer flange section 108 inhibits the radially outward "bulging" of retaining lugs 24 upon increased pressure within the fuel tank 16. The internal surface of the slot-like opening 104 could also be cut at an angle so that when it engages the encapsulated leg 28 it forces the leg 28 inward causing a preloaded condition. However, it is contemplated that the slot-like opening 104 can have a width which does not produce contact between outer or second surface 27 and the outer flange section 108 until a limited predetermined amount of bulging has occurred. In either case, a seal element 44 will be maintained in a properly seated position within a groove 22. Substantially greater internal fluid pressures are therefore possible following vehicular impact without the danger of excessive leakage of fuel and fumes.

Although this and all other preferred embodiments of the invention are described with an O-ring seal element seated in a groove, such as a seal element 44 seated within a groove 22, it is within the scope of all embodiments of the invention to utilize any available seal arrangement which would provide a fluid-tight seal between a fuel sender assembly and a fuel tank. Accordingly, the O-ring seal element seated in a groove is used herein for purposes of exemplification only. Other suitable seal arrangements include O-rings with round or square cross-sections, flat seals, Quad-rings (a product of Minnesota Rubber, Inc.) and any custom designed seals.

Figure 8:
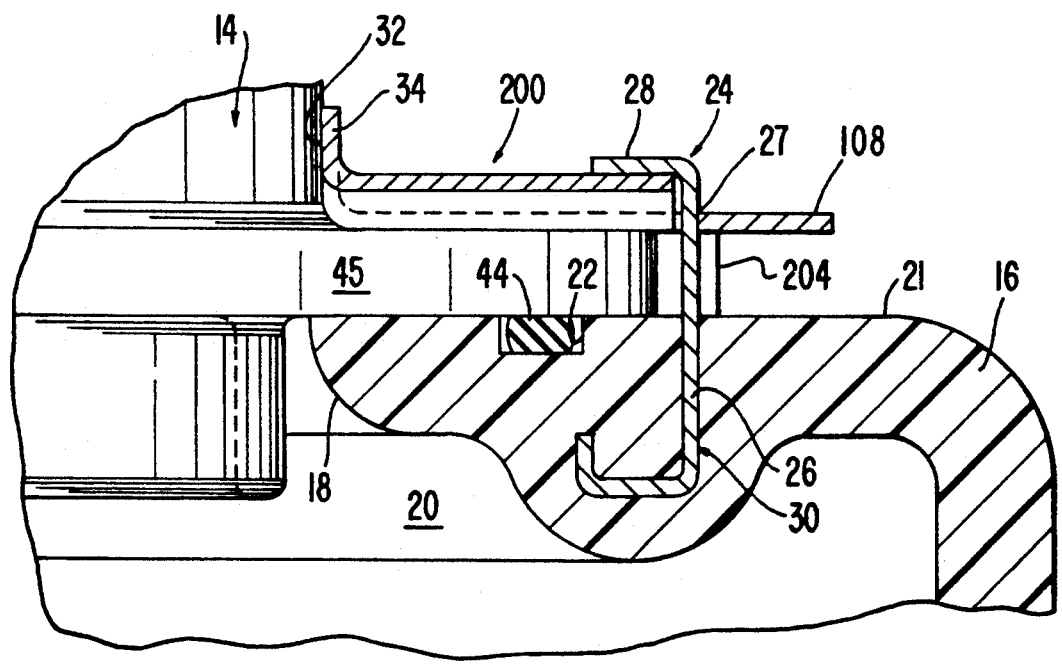
FIG. 8 is a cross-sectional view taken along line 8—8 of FIG. 7.
Figure 7:
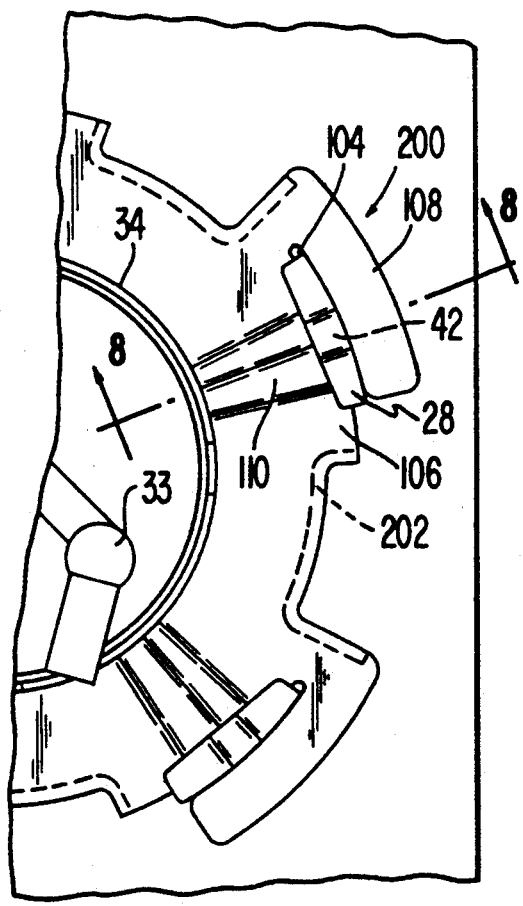
FIG. 7 is a partial top view of a fuel tank assembly incorporating a fuel sender locking ring according to a second preferred embodiment of this invention.

Referring now to FIGS. 7 and 8, a second preferred embodiment of the present invention is disclosed. A locking ring 200 is identical to that of a locking ring 100 previously described, except for the addition of down-turned support members 202 provided as a flange along the peripheral edge of the locking ring 200. Support members 202 have an end portion 204 which, preferably, rests on an external surface 21 of a fuel tank 16. The support members 202 supplement outer flange 108 in resisting deformation ("bulging") of retaining lugs 24. Therefore, a sender plate 45 and the locking ring 200 are not permitted to prematurely distort and/or yield due to pressures acting thereon so as to prevent the release of fuel tank fumes and liquids.

Figure 9:
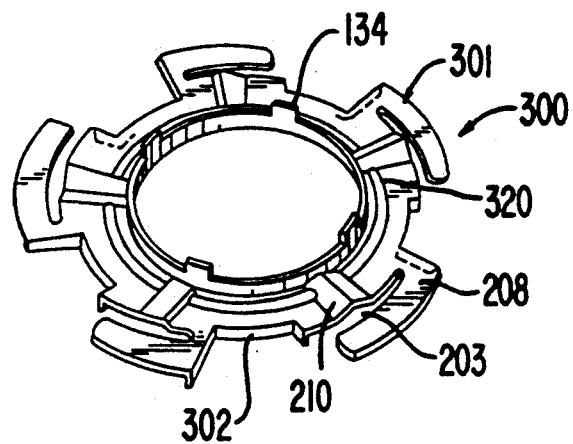
FIG. 9 is a perspective view of a fuel sender locking ring according to a third preferred embodiment of this invention.
Figure 10:
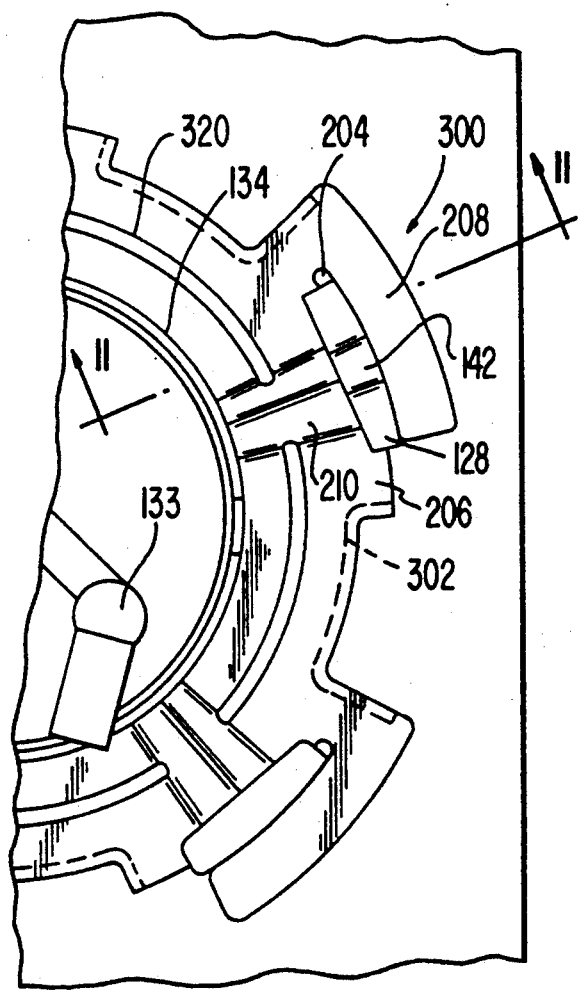
FIG. 10 is a partial top view of the fuel sender locking ring of the embodiment of FIG. 9.
Figure 11:
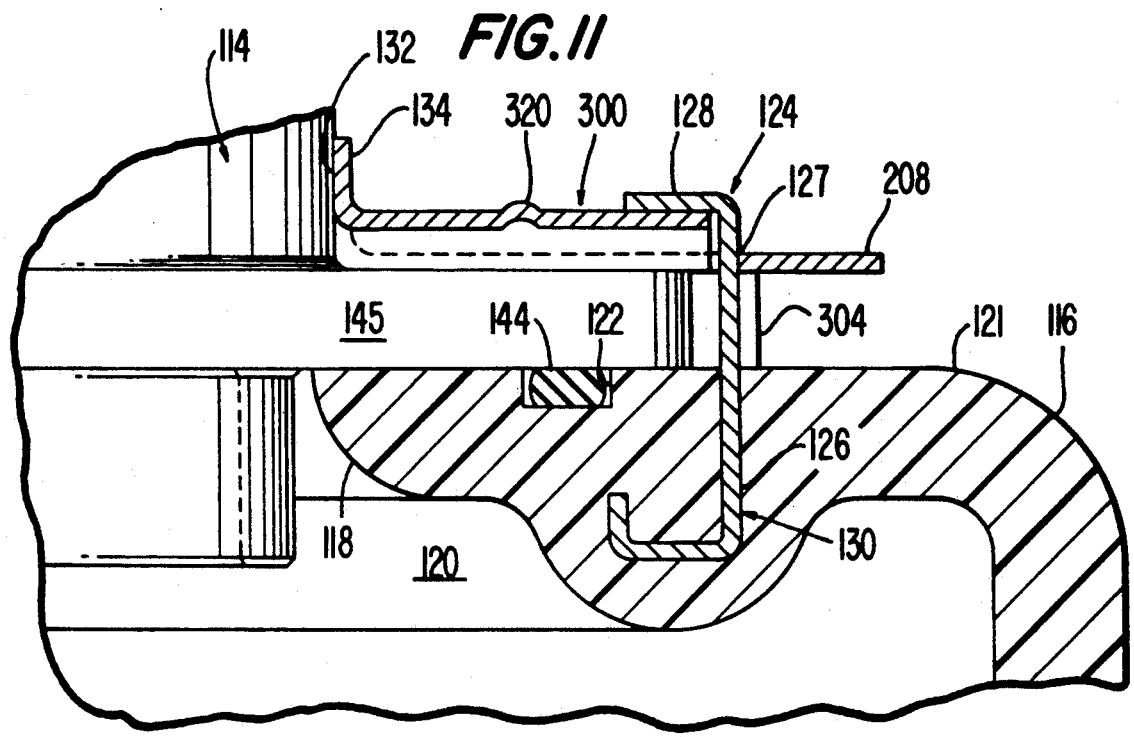
FIG. 11 is a cross-section taken along line 11—11 of the fuel sender locking ring of the embodiment of FIG. 9.
Figure 12:
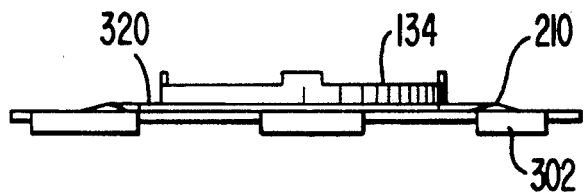
FIG. 12 is a side view of a fuel sender locking ring of FIG. 9.

Referring now to FIGS. 9–12, a third preferred embodiment of the invention is disclosed. This embodiment is similar to the embodiment of FIGS. 7–8. Accordingly, whenever possible without creating conflicting numeral designations, the components in FIGS. 9–12 corresponding to those of FIGS. 7–8 are designated by the same numerals as in FIGS. 7–8, but a numeral of "100" is added thereto. For example, the locking ring 300 of FIG. 9 corresponds to the locking ring 200 of FIG. 7. The embodiment of FIGS. 9–12 has upwardly projecting protrusions 320, extending in a radial direction of the locking ring, i.e., placed around the circumference of the locking ring 300. The protrusions, numbering five in FIG. 9, provide additional structural integrity to the fuel sender locking ring 300. The number and shape of protrusions 320 on the ring may vary, depending on a variety of factors, such as the size and shape of the ring and the type of fuel tank for which it is used. The structure of the ring of FIGS. 9–11 is summarized below.

At its outermost peripheral edge, the locking ring 300 is provided with a plurality of radially outwardly extending tabs 301. The tabs 301 include a slot-like arcuate opening 203 extending from one end thereof. The opening 203 defines an inner flange section 206 and an outer flange section 208. The inner flange section 206 includes a centralized portion upon which an upwardly cold-deformed protrusion is provided to define an integral locking surface or engaging means 210. The locking surface or engaging means 210 is configured to be lockingly captured in a cavity 142 of a second leg 128 provided on an "L-shaped" retaining lug 124. An outer flange section 208 of tabs 301 surrounds an outer or second surface 127 of a first leg 126 of the retaining lug 124. Preferably, the width of a slot-like opening 204 is dimensioned such that the outer or second surface 127 of the first leg 126 and the outer flange section 208 of tabs 301 are in abutting line contact along generally the entire length of slot-like opening 204. In this manner, the outer flange section 208 inhibits the radially outward "bulging" of retaining lugs 124 upon increased pressure within the fuel tank 116. However, it is contemplated that the slot-like opening 204 can have a width which does not produce contact between outer or second surface 127 and the outer flange section 208 until a limited predetermined amount of bulging has occurred. In either case, a seal element 144 will be maintained in a properly seated position within a groove 122. Substantially greater internal fluid pressures are therefore possible following vehicular impact without the danger of excessive leakage of fuel and fumes.

The ring 300 also comprises down-turned support members 302, provided as a flange along the peripheral edge of the locking ring 300. Support members 302 have an end portion 304. The end portion preferably rests on a planar external surface 121 of the tank 116. The support members 302 supplement outer flanges 208 in resisting deformation ("bulging") of retaining lugs 124. Therefore a sender plate 145 and the locking ring 300 are prevented from premature distortion and/or yielding to pressures which may act thereon. This prevents the release of fuel tank fumes and liquids. It is also within the scope of this invention to omit support members 302 in the embodiment of FIGS. 9–12.

A fourth preferred embodiment of the invention is illustrated in FIGS. 13–16. This embodiment is similar to the embodiment of FIGS. 9–12. Accordingly, whenever possible without creating conflicting numeral designations, the components in FIGS. 13–16 corresponding to those of FIGS. 9–12 are designated by the same numerals as in FIGS. 9–12, but a numeral of "100" is added thereto. For example, the locking ring 400 of FIG. 13 corresponds to the locking ring 300 of FIG. 10.

The embodiment of FIGS. 13–16 has upwardly projecting protrusions 420 placed in the outside surface of and around the circumference of the fuel locking ring 400. The protrusions have the shape of two elongated rectangles intersecting substantially in the middle of the respective rectangles. The two rectangles intersect substantially at a 90° angle with respect to each other. The protrusions extend in a radial direction of the locking ring. Five separate protrusions 420 are shown in the embodiment of FIGS. 13–16. The number of protrusions and their shape may vary, depending on a variety of factors, such as the size and shape of the ring, the type of fuel tank for which the ring is used and the type of fuel present in the fuel tank. The protrusions 420 provide additional structural integrity to the fuel sender locking ring 400. The structure of the ring 400 is substantially the same as that of the fuel sender locking ring 300 in FIGS. 9-12. The operation and function of the ring 300 will therefore be clear to those skilled in the art from the above detailed description of the embodiments of FIGS. 9-12. However, for the sake of completeness, the structure of the fuel sender locking ring 400 is summarized below.

The ring 400 comprises down-turned support members 402 provided as a flange along the peripheral edge of the locking ring 400. Support members 402 have an end portion 404. The end portion preferably rests on a planar external surface 221 of the fuel tank 216. The support members 402 supplement outer flanges 308 in resisting deformation ("bulging") of retaining lugs 224. Therefore, a sender plate 245 and the locking ring 400 are prevented from premature distortion and/or yielding to pressures which may act thereon. This prevents the release of fuel tank fumes and liquids. It is also within the scope of this invention to omit support members 402.

FIGS. 17-20 illustrate a fifth preferred embodiment of the invention. Except for the modifications unique to this fifth embodiment, discussed below, this embodiment of the fuel sender locking ring is substantially the same as the fuel sender locking ring of FIGS. 4-6. Accordingly, the construction and operation of the fifth embodiment will be apparent to those skilled in the art from the above detailed description of FIGS. 4-6 and from the following discussion of FIGS. 17-20.

Whenever possible without creating conflicting numeral designations, the components in FIGS. 17-20 corresponding to those of FIGS. 4-6 are designated by the same numerals as in FIGS. 4-6, but a numeral of 400 is added thereto. For example, the locking ring 500 of FIG. 17 corresponds to the locking ring 100 of FIG. 5.

The locking ring 500 comprises a central aperture 432 through which an upper portion of a fuel sender assembly 414 passes. This allows the connection of external fuel delivery and exhaust lines and electrical connectors (not shown in FIGS. 17-20) to the fuel tank. An axially extending rim 434, provided on the locking ring 500, surrounds the upper portion of the fuel sender assembly 414. At its outermost peripheral edge surface, the locking ring 500 comprises a plurality of radially outwardly extending tabs 502. The tabs 502 comprise a slot-like arcuate opening 504 extending from one end of the tabs. The opening 504 defines an inner flange section 506 and an outer flange section 508. Preferably, the width of a slot-like opening 504 is dimensioned such that an outer or second surface 427 of the first leg 426 and the outer flange 508 of the tabs 502 are in abutting line contact along generally the entire length of the slot-like opening 504. Accordingly, the outer flange section 508 inhibits the radially outward "bulging" of the retaining lugs 424 upon increased pressure within the fuel tank 416. However, the invention encompasses an embodiment wherein the slot-like opening 504 may have a width which does not produce contact between the outer or second surface 427 and the outer flange 508 until a limited, predetermined amount of bulging has occurred. In either case, a seal element 444 will be maintained in a properly seated position within a groove 422.

It is preferred that the length of the slot-like opening 504 is such that the forward edge 429 of the first leg 426 abuts against an end 505 of the opening 504 when the retaining lug 424 is lockingly engaged by the retaining ring 500.

A fuel tank assembly further includes a means for semi-permanently securing the locking ring 500 to the fuel tank 416. This includes an outer ring 550 (FIG. 20), preferably embedded in the fuel tank. The ring 550 comprises a plurality of evenly spaced retaining lugs 424, located radially outward of an opening in the tank receiving the fuel sender assembly. The retaining lugs 424 are disposed around the circumference of the opening and have a first leg 426 extending substantially transversely to the planar external surface 421 of the fuel tank 416. A second leg 428 is provided which extends radially inwardly from the first leg 426 and is generally parallel to the planar external surface 421, so as to generally define an inverted "L-shaped" configuration for the retaining lugs 424. Retaining lugs 424 are integral extensions of a ring 550, preferably permanently encapsulated into the fuel tank 416. Further, it is preferable that the fuel tank 416 be fabricated from a thermoplastic material into which the encapsulated ring 550 is permanently secured during the molding process. Such processing could include blow-molding or rotational-molding for the tank fabrication. Again, however, it is within the scope of this invention that the tank 416 be fabricated from any suitable material applicable for pressurized vessels. Likewise, it is contemplated that the ring 550 can be secured directly to the planar surface 421 via conventional bonding or welding methods.

Figure 17:
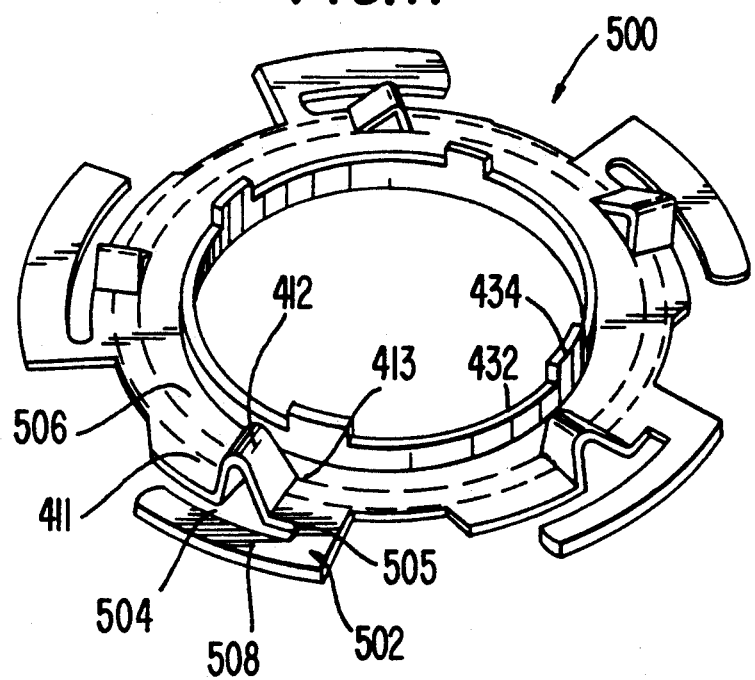
FIG. 17 is a perspective view of a fuel sender locking ring according to a fifth preferred embodiment of this invention.
Figure 18:
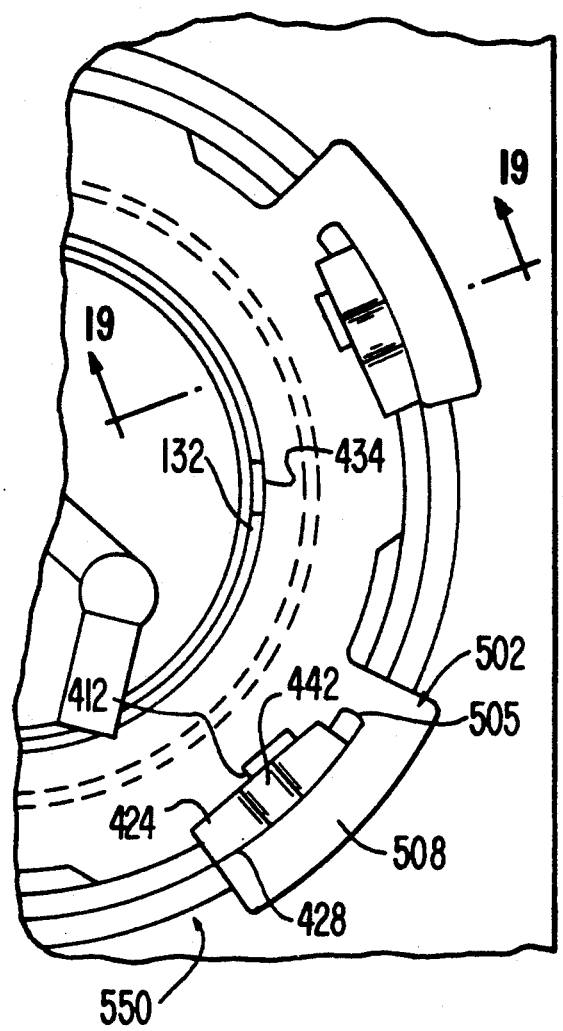
FIG. 18 is a partial top view of the fuel sender locking ring, in a locked engagement with a fuel tank assembly, of the embodiment of FIG. 17 of this invention.
Figure 19:
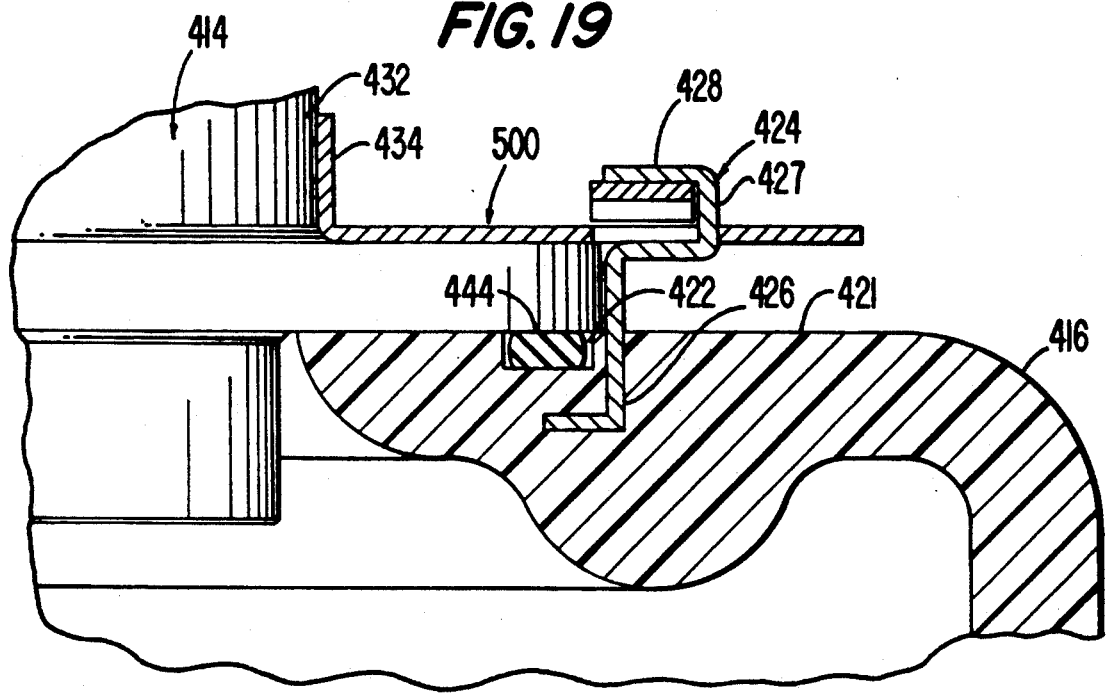
FIG. 19 is a cross-section taken along line 19—19 of FIG. 18.
Figure 20:
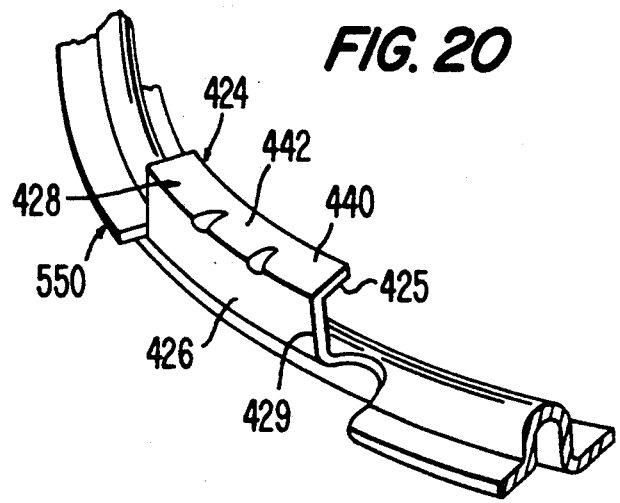
FIG. 20 is a partial perspective view of an outer ring used in conjunction with the fuel sender locking ring of FIG. 17.

Each tab 502 is configured to be received into an "L-shaped" retaining lug 424 upon rotation of the locking ring 500 into a locked position. The tabs 502 have an upstanding projection 411 at one end. The projection 411 has a slightly greater height than the second leg 428 of the retaining lug 424. Since the projection 411 has some elasticity, it is depressed when its upper surface 412 is engaged by the forward edge 425 (FIG. 20) of the retaining lug 424. Subsequently, the projection 411 enters the retaining lug 424, and it is lockingly engaged by a cavity 442 provided in the second leg 428 of the retaining lug 424. It is preferred that the upstanding projection 411 has the width substantially the same as or slightly greater than the second leg 428 (FIGS. 18 and 19). As shown in FIG. 17, bottom 413 of the upstanding projection is not connected to the surface of the tab 502.

Figure 13:
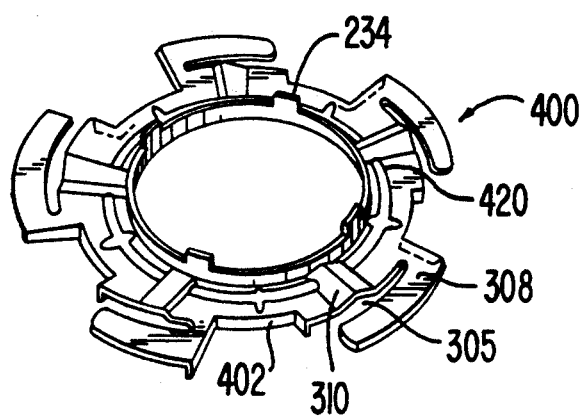
FIG. 13 is a perspective view of a fuel sender locking ring according to a fourth preferred embodiment of this invention.
Figure 14:
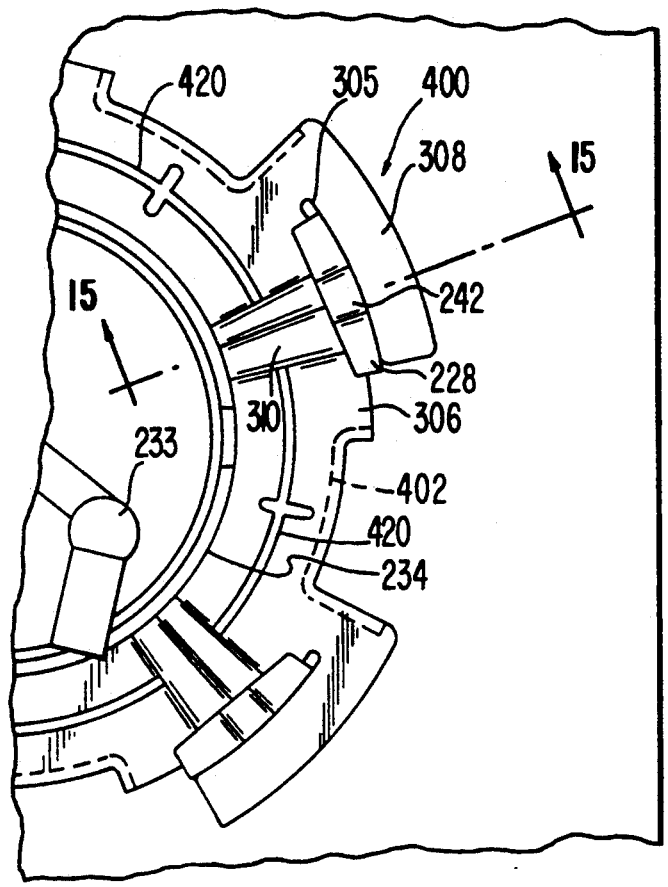
FIG. 14 is a partial top view of the fuel sender locking ring of the embodiment of FIG. 13.
Figure 15:
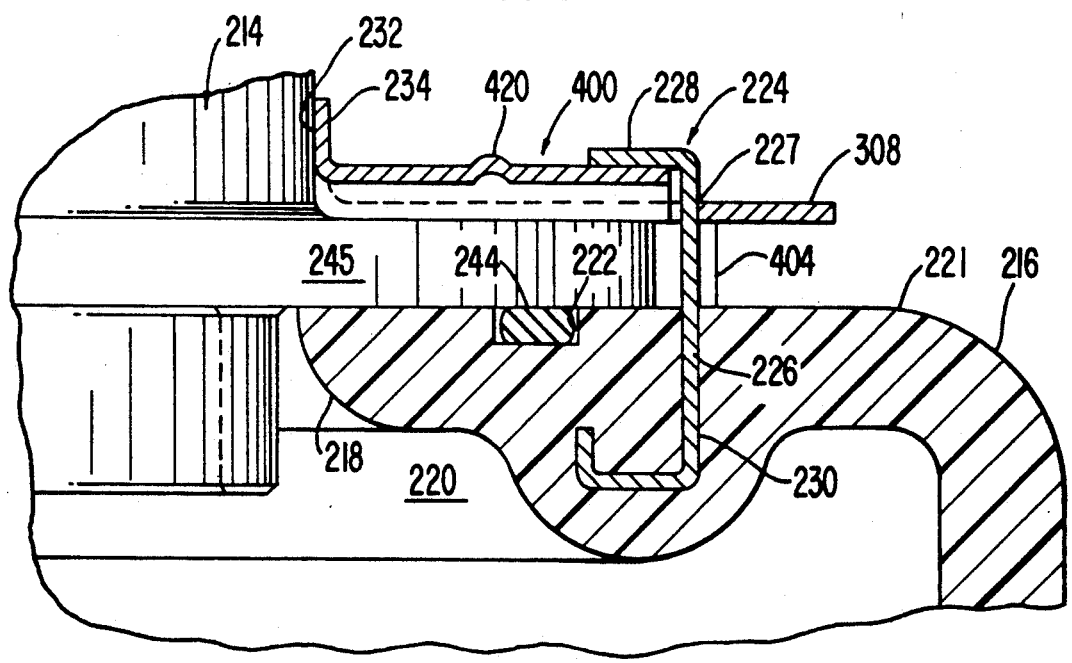
FIG. 15 is a cross-section taken along line 15—15 of FIG. 14.
Figure 16:
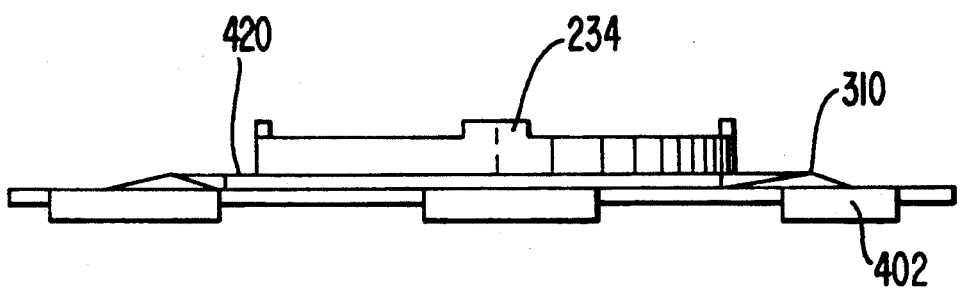
FIG. 16 is a side view of the fuel sender locking ring of the embodiment of FIG. 13.

It is also within the scope of this invention to provide one or more upstanding protrusions in the surface of the locking ring 500, similar to the protrusions 320 in FIG. 10 and 420 in FIG. 13. Such protrusions are illustrated schematically in dotted lines in FIGS. 17 and 18.

It is contemplated that the improved locking ring structures disclosed above can be used in any application requiring means for creating a pressurized fluid-tight seal between a cap-like member and a pressurizable vessel which is capable of withstanding substantially greater fluid pressure build-ups.

An improved locking ring for lockingly securing and sealing a fuel sender assembly to a fuel tank is described above. Those skilled in the art will appreciate that other advantages can be obtained from the use of this invention and that modifications can be made without departing from the true spirit of the invention. Furthermore, the foregoing description of the preferred embodiments according to the present invention is provided for the purpose of illustration only and not for purposes of limitation--the invention being defined by the following claims.

We claim:

1. A fuel tank assembly comprising:
   (A) a hollow pressurizable tank for storing liquid fuel and having an aperture extending through a generally planar external surface;
   (B) a fuel sender unit at least partially disposed within said aperture and having a radially extending shoulder having generally parallel planar first and second surfaces, said second surface adapted for mating contact with said planar external surface of said tank, so as to enclose said aperture;
   (C) a sealing means disposed between said second surface of said fuel sender unit and said planar, external surface of said tank for producing a fluid-tight seal therebetween;
   (D) a plurality of retaining lugs having a first leg member extending substantially perpendicularly from said planar, external surface of said tank, said first leg member having a first and second surface, and a second leg member continuous with and extending generally orthogonally from an end of said first leg member, said retaining lugs located around the periphery of said aperture and radially outward of said shoulder of said fuel sender unit; and
   (E) a locking ring comprising an engaging means for lockingly engaging said second leg member of said retaining lugs, said engaging means adapted to coact with said second leg member of said retaining lugs to bias said shoulder of said fuel sender unit against said external tank surface and said sealing means for locking said fuel sender unit to said tank at a position radially inward of said first surface of said first leg member, said locking ring further comprising one or more tabs for surrounding said second surface of said first leg member of said retaining lugs, said tabs inhibiting permanent radially outward deformation of said retaining lugs due to increased pressure within said tank, said locking ring further comprising a least one upwardly projecting protrusion extending in at radial direction of said locking ring and placed in a surface of said locking ring.

2. A fuel tank assembly of claim 1 wherein said locking ring comprises several of said upwardly projecting protrusions.

3. A fuel tank assembly of claim 1 wherein each of said upwardly projecting protrusions has the shape of an elongated rectangle.

4. A fuel tank assembly of claim 1 wherein said protrusions are spaced about the circumference of said locking ring.

5. A fuel tank assembly according to claim 1 wherein said external tank surface further comprises a groove located intermediate said aperture and said retaining lugs, and wherein said sealing means comprises a seal element disposed within said groove.

6. A fuel tank assembly according to claim 1 wherein said retaining lugs are equally spaced around the periphery of said aperture and are integral with said tank.

7. A fuel tank assembly according to claim 1 wherein said retaining lugs extend from a ring-like member permanently secured to said tank and wherein said retaining lugs are substantially equally spaced around the periphery of said aperture.

8. A fuel tank assembly according to claim 1 wherein said retaining lugs are concentric with and equally spaced around the periphery of said aperture and further comprise cavity means associated with said second leg member for lockingly capturing said engaging means upon rotation of said locking ring to a locked position relative to said retaining lugs.

9. A fuel tank assembly according to claim 1 wherein said locking ring is adapted to matingly engage said first surface of said fuel sender unit shoulder, wherein said engaging means comprises a plurality of locking surfaces corresponding in number and angular positioning to said plurality of retaining lugs, said tabs extending radially outwardly from the peripheral edge of said locking ring and having a slot-like opening extending from one end thereof so as to define an inner flange section and an outer flange section, said inner flange section adapted to lockingly engage said second leg member of said retaining lugs, and said outer flange section defining said support means for generally surrounding said first leg of said retaining lugs.

10. A fuel tank assembly according to claim 9 wherein each said second leg member of said retaining lugs comprises a similarly shaped receptacle for lockingly capturing said locking surface therein upon rotation of said locking ring to a locked position relative to said retaining lugs, and wherein said slot-like opening has a width dimension such that said outer flange section is aligned adjacent said second surface of said first leg member of said retaining lugs so as to inhibit substantial permanent outward radial deformation thereof.

11. A fuel tank assembly according to claim 10 wherein said locking ring further comprises a flanged member provided at a radially outermost edge of said locking ring and extending generally parallel to said first leg member of said retaining lugs, said flanged member being adapted to engage said external tank surface to inhibit substantial permanent radially outward deformation of said retaining lugs.

12. A fuel tank assembly according to claim 8 wherein said tabs correspond in number and angular positioning to said plurality of retaining lugs, said tabs extend radially outwardly from a peripheral edge of said locking ring, and wherein said engaging means is an upwardly protruding locking surface associated with said locking ring for lockingly engaging said cavity means of said second leg member.

13. A fuel tank assembly according to claim 12 wherein said tabs further comprise a slot-like opening through which said retaining lugs are disposed upon rotation of said locking ring to said locked position relative to said retaining lugs, said slot-like opening defining an inner flange section upon which said engaging means is provided and an outer flange section adapted to generally surround said first leg member of said retaining lugs for inhibiting outward deformation of said retaining lugs.

14. A fuel tank assembly according to claim 13 wherein said slot-like opening is arcuate and of such a length as to locate said locking surface of said locking ring with said cavity means.

15. A fuel tank assembly of claim 2 wherein each of said upwardly projecting protrusions has substantially in shape of two elongated intersecting rectangles.

16. A fuel tank assembly of claim 15 wherein said protrusions are spaced about the circumference of said locking ring.

17. A fuel tank assembly of claim 15 wherein said external tank surface further comprises a groove located intermediate said aperture and said retaining lugs, and wherein said sealing means comprises a seal element disposed within said groove.

18. A fuel tank assembly of claim 15 wherein said retaining lugs are equally spaced around the periphery of said aperture and are integral with said tank.

19. A fuel tank assembly of claim 15 wherein said retaining lugs are concentric with and equally spaced around the periphery of said aperture and further comprise cavity means associated with said second leg member for lockingly capturing said engaging means upon rotation of said locking ring to a locked position relative to said retaining lugs.

20. A fuel tank assembly of claim 15 wherein said locking ring is adapted to matingly engage said first surface of said fuel sender unit shoulder, wherein said engaging means comprises a plurality of locking surfaces corresponding in number and angular positioning to said plurality of retaining lugs, said tabs extending radially outwardly from the peripheral edge of said locking ring and having a slot-like opening extending from one end thereof so as to define an inner flange section and an outer flange section, said inner flange section adapted to lockingly engage said second leg member of said retaining lugs, and said outer flange section defining said support means for generally surrounding said first leg of said retaining lugs.

21. A fuel tank assembly of claim 20 wherein each said second leg member of said retaining lugs comprises a similarly shaped receptacle for lockingly capturing said locking surface therein upon rotation of said locking ring to a locked position relative to said retaining lugs, and wherein said slot-like opening has a width dimension such that said outer flange section is aligned adjacent said second surface of said first leg member of said retaining lugs so as to inhibit substantial permanent outward radial deformation thereof.

22. A fuel tank assembly of claim 21 wherein said locking ring further comprises a flanged member provided at a radially outermost edge of said locking ring and extending generally parallel to said first leg member of said retaining lugs, said flanged member being adapted to engage said external tank surface to inhibit substantial permanent radially outward deformation of said retaining lugs.

23. A fuel tank assembly of claim 22 wherein said tabs correspond in number and angular positioning to said plurality of retaining lugs, said tabs extend radially outwardly from a peripheral edge of said locking ring, and wherein said engaging means is an upwardly protruding locking surface associated with said locking ring for lockingly engaging said cavity means of said second leg member.

24. A fuel tank assembly of claim 23 wherein said tabs further comprise a slot-like opening through which said retaining lugs are disposed upon rotation of said locking ring to said locked position relative to said retaining lugs, said slot-like opening defining an inner flange section upon which said engaging means is provided and an outer flange section adapted to generally surround said first leg member of said retaining lugs for inhibiting outward deformation of said retaining lugs.

25. A fuel tank assembly of claim 24 wherein said slot-like opening is arcuate and of such a length as to locate said locking surface of said locking ring with said cavity means.

26. A fuel tank assembly comprising:
(A) a hollow pressurizable tank for storing liquid fuel and having an aperture extending through a generally planar external surface;
(B) a fuel sender unit at least partially disposed within said aperture and having a radially extending shoulder having generally parallel planar first and second surfaces, said second surface adapted for a mating contact with said planar external surface of said tank, so as to enclose said aperture;
(C) a sealing means disposed between said second surface of said fuel sender unit and said planar external surface of said tank for producing a fluid-tight seal therebetween;
(D) a plurality of retaining lugs having a first leg member extending substantially perpendicularly from said planar, external surface of said tank, said first leg member having a first and second surface, and a second leg member continuous with and extending generally orthogonally from an end of said first leg member, said retaining lugs located around the periphery of said aperture and radially outward of said shoulder of said fuel sender unit; and
(E) a locking ring comprising an engaging means for lockingly engaging said retaining lugs, said engaging means adapted to coact with said second leg member of said retaining lugs to bias said shoulder of said fuel sender unit against said external tank surface and said sealing means for locking said fuel sender unit to said tank at a position radially inward of said first surface of said first leg member, said locking ring further comprising one or more tabs for surrounding said second surface of said first leg of said retaining lugs, said tabs inhibiting permanent radially outward deformation of said retaining lugs due to increased pressure within said tank;
said tabs comprising an inner flange and an outer flange, said inner flange comprising an upstanding projection which is capable of being lockingly engaged by said second leg member of said retaining lugs.

27. A fuel tank assembly of claim 26 wherein the upstanding projection has the width substantially the same as or greater than the width of said second leg member.

28. A fuel tank assembly of claim 26 wherein the upstanding projection is capable of being lockingly engaged by a cavity in said second leg member.

29. A fuel tank assembly of claim 26 wherein only one end of the upstanding projection is connected to said tabs.

30. A fuel tank assembly of claim 29 wherein said locking ring comprises at least one upwardly projecting protrusion placed in a surface of said locking ring.

31. A fuel tank assembly of claim 30 wherein each of said upwardly projecting protrusions has the shape of an elongated rectangle.

32. A fuel tank assembly of claim 31 wherein said protrusions are spaced about the circumference of said locking ring.

33. A fuel tank assembly of claim 30 wherein each of said upwardly projecting protrusions has substantially the shape of two elongated intersecting rectangles.

34. A fuel tank assembly of claim 33 wherein said protrusions are spaced about the circumference of said locking ring.

35. A fuel tank assembly of claim 26 wherein said external tank surface further comprises a groove located intermediate said aperture and said retaining lugs, and wherein said sealing means comprises a seal element disposed within said groove.

36. A fuel tank assembly of claim 26 wherein said retaining lugs are equally spaced around the periphery of said aperture and are integral with said tank.

37. A fuel tank assembly of claim 26 wherein said retaining lugs extend from a ring-like member permanently secured to said tank, and wherein said retaining lugs are substantially equally spaced around the periphery of said aperture.

38. A fuel tank assembly according to claim 26 wherein said retaining lugs are concentric with and equally spaced around the periphery of said aperture and further comprise cavity means associated with said second leg member for lockingly capturing said engaging means upon rotation of said locking ring to a locked position relative to said retaining lugs.

39. A fuel tank assembly of claim 38 wherein said tabs further comprise a slot-like opening through which said retaining lugs are disposed upon rotation of said locking ring to said locked position relative to said retaining lugs, said slot-like opening defining an inner flange section upon which said engaging means is provided and an outer flange section adapted to generally surround said first leg member of said retaining lugs for inhibiting outward deformation of said retaining lugs.

40. A fuel tank assembly of claim 39 wherein said slot-like opening is arcuate and of such a length as to locate said locking surface of said locking ring with said cavity means.

41. A locking member for use in a fuel tank assembly which comprises a pressurizable tank with an aperture extending through an external surface of said tank and a plurality of retaining lugs transversely extending from said external surface along the periphery of said tank aperture, a fuel sender assembly having a first portion disposed within said tank and a second portion external to said tank having a plate-like shoulder with a lower surface in a mating contact with said external tank surface, a seal element disposed between said tank and said fuel sender assembly in an annular groove or other seal arrangement provided in said external tank surface intermediate said aperture and said retaining lugs, said locking member comprising:
a locking ring having an aperture through which a portion of said fuel sender assembly extends, said locking ring having a generally planar lower surface in a mating contact with an upper surface of said second portion of said fuel sender assembly and having a plurality of lug supports corresponding to said plurality of retaining lugs, said lug supports having locking means for lockingly engaging said retaining lugs and lug support means surrounding said retaining lugs for inhibiting permanent deformation of said retaining lugs due to greater fluid pressure within said tank; said locking ring comprising at least one upwardly projecting protrusion placed in a surface of said ring, said upwardly projecting protrusion enhancing structural integrity of said locking ring.

42. A locking member of claim 40 wherein said locking means comprises an upstanding projection which is capable of being engaged by said retaining lugs.

43. A locking ring for locking a fuel sender assembly to a fuel tank comprising:
an aperture through which a portion of said fuel sender assembly extends from said fuel tank;
a surface adapted for a mating contact with said portion of said fuel sender assembly;
at least one upwardly projecting protrusion extending in a radial direction of said locking ring, placed in a surface of said locking ring;
a plurality of lug supports comprising:
a locking means adapted for lockingly engaging retaining lugs of said fuel tank; and,
a lug support means adapted to surround said retaining lugs.

44. A locking ring according to claim 43 wherein said lug support means inhibits permanent deformation of said retaining lugs due to increased pressure within said fuel tank.

45. A locking ring according to claim 44 wherein each of said upwardly projecting protrusions has the shape of an elongated rectangle.

46. A locking ring according to claim 44 wherein each of said upwardly projecting protrusions has substantially the shape of two elongated intersecting rectangles.

47. A locking ring according to claim 43 wherein said locking ring further comprises at least one flanged support member associated with said lug supports, said flanged support member being located at a radially outward edge of said locking ring and extending generally parallel to said retaining lugs and into engagement with external surface of said tank to inhibit permanent deformation of said retaining lugs.

48. A locking ring for locking a fuel sender assembly to a fuel tank comprising:
an aperture through which a portion of said fuel sender assembly extends from said fuel tank;
a surface adapted for a mating contact with said portion of said fuel sender assembly; and
a plurality of lug supports comprising:
a locking means adapted for lockingly engaging retaining lugs of said fuel tank; and
a lug support means adapted to surround said retaining lugs,
said lug support means comprising an opening engaging said retaining lugs, said opening defining an inner flange section and an outer flange section, said outer flange section coming into contact with an outer surface of each of said retaining lugs when each of said retaining lugs undergoes a predetermined amount of bulging due to increased pressure within said fuel tank.

* * * * *